United States Patent [19]

Cottam et al.

[11] Patent Number: 5,122,740
[45] Date of Patent: Jun. 16, 1992

[54] ROTATIONAL SPEED PROBE SUBASSEMBLY WITH SHROUD ARRANGED FOR MOUNTING PROBE TRANSDUCER TO A SUPPORT HOUSING

[75] Inventors: Michael J. Cottam, Lancaster; Philip A. Morris, Manchester, both of England

[73] Assignee: Eaton Corporation, Cleveland, Ohio

[21] Appl. No.: 654,126

[22] Filed: Feb. 11, 1991

[30] Foreign Application Priority Data

Feb. 14, 1990 [GB] United Kingdom ................ 9003394
Jan. 16, 1991 [GB] United Kingdom ................ 9100926

[51] Int. Cl.$^5$ .......................... G01P 3/44; G01P 3/488
[52] U.S. Cl. ...................................... 324/173; 73/661; 310/168; 324/207.15
[58] Field of Search .............. 324/173, 174, 207.15, 324/207.16, 207.25; 73/660, 661; 310/68 B, 155, 168

[56] References Cited

U.S. PATENT DOCUMENTS

| 3,769,533 | 10/1973 | Pauwels | 310/155 |
| 3,776,027 | 12/1973 | Campbell | 73/661 X |
| 3,854,556 | 12/1974 | Gee | 188/181 |
| 3,898,562 | 8/1975 | Mizikar et al. | |
| 4,090,592 | 5/1978 | Jovick et al. | 188/181 |
| 4,097,756 | 6/1978 | Gee | 310/155 |
| 4,367,650 | 1/1983 | Hilgner et al. | 73/661 X |
| 4,510,408 | 4/1985 | Jovick et al. | 324/173 X |
| 4,841,243 | 6/1989 | Bishop et al. | 324/173 X |
| 4,862,025 | 8/1989 | Dierker, Jr. et al. | 310/68 |
| 4,893,075 | 1/1990 | Dierker, Jr. | 324/174 |
| 4,937,522 | 6/1990 | Gee | 324/174 |
| 4,992,734 | 2/1991 | Adachi | 324/207.25 |
| 5,006,797 | 4/1991 | Smith | 324/207.25 X |

FOREIGN PATENT DOCUMENTS 320566 6/1989 European Pat. Off.
2619450 2/1989 France.

Primary Examiner—Gerard R. Strecker
Attorney, Agent, or Firm—H. D. Gordon

[57] ABSTRACT

A probe transducer subassembly for a rotational speed sensor assembly is provided. A probe body (1) has a transducer portion (14) extending through an opening (19) into the interior of housing for electromagnetic cooperation with an exciter rotor, a distal portion (15) carrying connection devices extending therefrom and an enlarged diameter intermediate portion defining inwardly and outwardly facing shoulders. The shoulders cooperate with the exterior surface of the housing surrounding the opening and a shoulder in a shroud member (2) to axially position the probe in the housing and allow the probe to be clamped between the housing and the shroud.

10 Claims, 1 Drawing Sheet

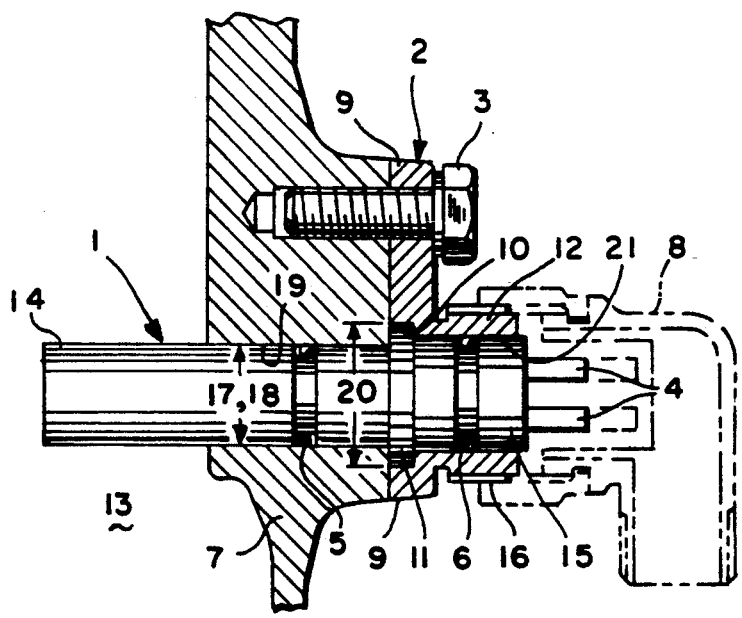
Fig. 1
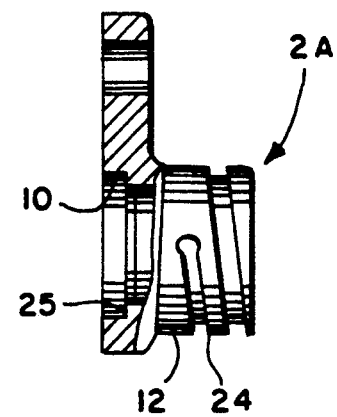
Fig. 3
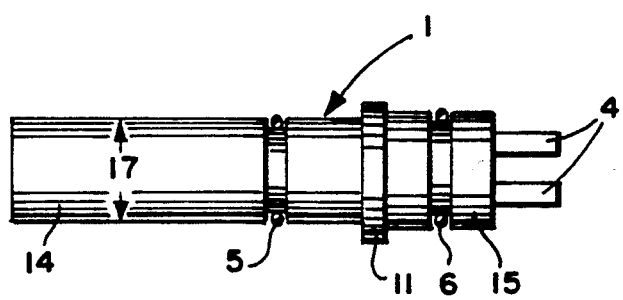
Fig. 2
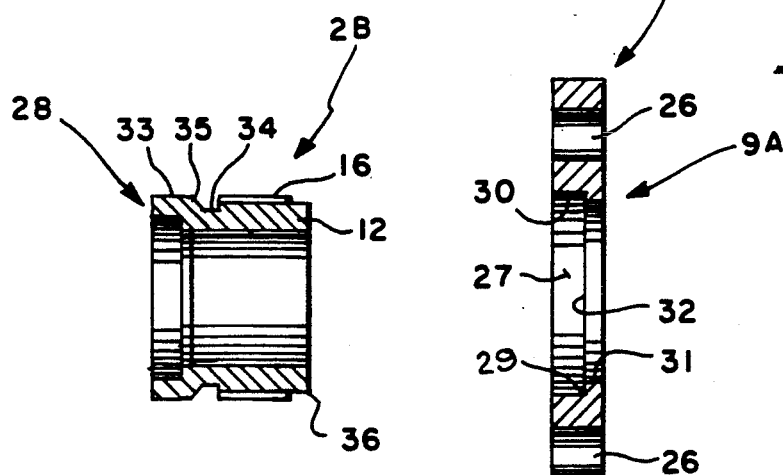
Fig. 4
Fig. 6
Fig. 5

ROTATIONAL SPEED PROBE SUBASSEMBLY WITH SHROUD ARRANGED FOR MOUNTING PROBE TRANSDUCER TO A SUPPORT HOUSING

BACKGROUND OF THE INVENTION

1. Related Applications

This application claims priority from British application No. 9003394.5 filed Feb. 14, 1990 and British application No. 9100926.6 filed Jan. 16, 1991.

2. Field of the Invention

The present invention relates to a rotational speed sensor assembly of the type comprising a rotating exciter fixed for rotation with the monitored device and a fixed probe transducer mounted to and extending through a housing for sensing relative rotation of the exciter.

In particular, the present invention relates to the structure of a speed sensor assembly probe transducer subassembly for mounting said probe in a fixed position extending through an aperture in a housing.

The probe transducer subassembly has a sensing probe end, an electrical termination/connection end and intermediate clamping and/or sealing means. The intermediate clamping/sealing means cooperate with a shroud allowing the probe end to be secured in a hostile environment subject to vibration, shock loading, lubricants and/or condensation.

3. Description of the Prior Art

Rotational speed sensor assemblies, especially for vehicular drive components, are well known in the prior art. Typically, such rotational speed sensor assemblies are utilized to sense the rotational velocity of a monitored object, such as a gear, shaft and/or wheel, relative to a fixed housing, or similar support. Examples of vehicular applications for rotational speed sensor assemblies include fully or partially automated transmission systems, anti-lock brake systems, differential lock-up systems and traction control systems. Examples of such systems may be seen by reference to U.S. Pat. Nos. 4,949,806; 4,947,331; 4,930,081; 4,849,899; 4,361,060; 4,263,824; 4,097,756; 4,724,935; 4,029,180; 4,804,237 and 3,966,267, the disclosures of which are incorporated herein by reference.

The rotational speed sensor assemblies typically comprise an exciter rotor subassembly rotationally fixed to the relatively rotatable monitored gear, shaft and/or wheel and a probe transducer subassembly fixed to a support housing and positioned in a predetermined manner relative to the exciter rotor.

Such rotational speed sensor assemblies are typically electromagnetic in nature and utilize the making and breaking of flux paths resulting from rotation of the exciter rotor relative to the probe to generate an induced current in the probe output, the magnitude, amplitude, and/or frequency of which is indicative of the relative rotational velocity of the exciter. In certain situations, the function of the exciter rotor may be provided by gear teeth, splines, or the like.

Examples of prior art vehicular rotational speed sensor assemblies may be seen by reference to U.S. Pat. Nos. 4,029,180; 4,862,025; 4,937,522; 4,893,075; 3,769,533; 4,854,556, 4,090,592 and 4,097,756, the disclosures of which are incorporated herein by reference.

A problem with prior art vehicular rotational speed sensor assemblies of the type having a probe transducer subassembly mounted to a housing and extending through an opening therein has been protecting the probe from damage due to vibrations, shock loadings, lubricants and/or water of condensation.

SUMMARY OF THE INVENTION

In accordance with the present invention, the drawbacks of the prior art are minimized by the provision of probe transducer subassembly for mounting through an opening in a support housing that will protect the probe body from vibrations and shock loading and will also protect the electrical connections from the corrosive effects of lubricants and/or water of condensation.

The present invention accomplishes the above by providing a probe transducer subassembly including the following features:

1. A generally cylindrical probe (1) which contains a transducer and is arranged to enter operatively a casing or housing (7) containing a rotating part;
2. A shroud (2) having one or more holes for a bolt (3) to clamp a flange (9) of the shroud to the casing;
3. The shroud having a stepped portion (10) whereby the said clamping of the flange (9) in turn clamps a portion of the probe of increased cross-section (11) to the outside of the casing, with some protection against fluid ingress and egress past the shroud, and anti-shock and vibration clamping of the probe (1);
4. The probe having a first groove (5) for an O-ring to prevent fluid passing into or out of the casing (7), and having a second groove (6) for an O-ring to assist the action of the clamped enlarged probe portion (11) in preventing fluid outside the shroud from entering an electrically terminating portion (4) of the probe; such O-rings assisting resilient rigidity of the probe; and
5. A standard thread (13) or other rotary tightening fitting such as bayonet, allows cooperation with an end environmental protection (8) for the shroud and probe, e.g. a wiring harness connector (8), to provide simultaneous electrical connection with said terminating portion (4) of the probe.

Further features will appear from the following description of the preferred embodiment thereof, given by way of example, in conjunction with the drawing.

BRIEF DESCRIPTION OF THE DRAWINGS

FIG. 1 is a partial sectional view illustrating the rotational speed sensor assembly probe transducer subassembly as mounted to a support housing.

FIG. 2 is an elevational view of the probe body of the subassembly of the present invention.

FIG. 3 is an elevational view of the shroud of the present invention.

FIG. 4 is an elevational view of an alternate shroud embodiment. FIGS. 5 and 6 are sectional views of an alternate, two-piece shroud embodiment.

DESCRIPTION OF THE PREFERRED EMBODIMENT

As indicated above, rotational speed sensor assemblies, especially for vehicular drive components and./or braking systems, are well known in the prior art. Typically, such rotational speed sensor assemblies are utilized to sense the rotational velocity of a monitored object, such as a gear, shaft and/or wheel, relative to a fixed housing, or similar support. Examples of vehicular applications for rotational speed sensor assemblies include fully or partially automated transmission systems, anti-lock brake systems, differential lock-up systems and traction control systems.

The rotational speed sensor assemblies typically comprise an exciter rotor subassembly rotationally fixed to the relatively rotatable monitored gear, shaft and/or wheel and a probe transducer subassembly fixed to a support housing and positioned in a predetermined manner relative to the exciter rotor.

Such rotational speed sensor assemblies are typically electromagnetic in nature and utilize the making and breaking of flux paths resulting from rotation of the exciter rotor relative to the probe to generate an induced current in the probe output, the magnitude, amplitude, and/or frequency of which is indicative of the relative rotational velocity of the exciter and the monitored rotating object.

The probe houses the transducer and, especially in vehicular applications, has to be mounted on a continuously vibrating housing, such as a transmission or axle housing, has to withstand external shock loading, and includes terminal connectors which must be protected against lubricants or other fluid such as water of condensation. These fluids should not be allowed to pass from the probe to the terminal connectors, or vice versa, as such fluids can cause corrosion or can otherwise interfere with the electrical properties, disrupting or breaking the transfer of the electrical pick-up signal.

Existing speed probe arrangements have suffered not only from connector, but also from body failures due to the aforementioned vibrations and shock loading.

Referring to the FIGS. 1-3 of the drawing, a speed probe 1 projects into a transmission, axle or other environment 13 having a housing 7 within which the relative rotational speed of an item (not shown), such as a gear or a shaft, is to be monitored. Probe 1 is generally cylindrical and its inwardly projecting portion 14 houses a transducer, which generates a voltage or current in electromagnetic cooperation with a relatively rotating exciter element (not shown) rotationally fixed to the monitored item of some sort. In any case, the voltage or current induced or developed at probe portion 14 is required to be faithfully conveyed to blade type connector terminals 4, extending from the other end of the probe body, for onward electrical utilization or display.

Probe body 1 is generally cylindrical and also includes an enlarged diameter clamping and/or sealing portion 11 intermediate the inwardly extending transducer portion 14 and an outwardly extending proximal portion 15 from which the connector blades, pins or other electric connectors 4 extend.

Probe body 1 is mechanically held in position against vibration and hostile ingress or egress of fluids by means of a shroud 2, which camps the wider cross-sectional clamping/sealing portion 11 of the probe body 1 to the housing 7. For this purpose, a stepped or counterbored portion 10 of the shroud 2 engages portion 11 of the probe whenever the flange portion 9 of the shroud is drawn up by a screw or screws 3 to the housing 7.

It is noted that the outer diameter 17 of transducer portion 14 and inner inner diameter 18 of the opening 19 in the housing through which the probe transducer assembly extends are generally equal while the outer diameter 20 of the enlarged diameter portion 11 is larger than the inner diameter of the bore 19 in housing 7 and the non-counterbored portion of the bore 21 in the shroud 2 to provide shoulders and bearing surfaces to limit insertion of the probe into the housing 7 and to allow the probe body 1 to be clamped in an axially fixed position between the outer wall of the housing and the shoulder in shroud 2 defined by the intersection of the counterbored 10 and non-counterbored portions of the bore 21.

In addition to the flange and stepped or counterbored portion, shroud 2 also has a neck portion 12 which at least just fits over the proximal end 15 of the probe, but should not substantially shroud the terminals 4. Neck portion 12 will cooperate reasonably closely with an O-ring 6, which fits in an annular external groove of the probe. This O-ring will resiliently protect terminals 4 from environmental contamination entering between the shroud flange and the housing 7. Another O-ring in a similar groove 5 in the transducer portion 14 of the probe cooperates with the bore 19 in the housing and resiliently protects against fluid passage into, or out, of the casing past the probe, in the presence of vibrations or shock loading.

The neck portion 12 of the shroud has an external fine (M27) thread 16, or like rotary advancement mechanism, which allows a cooperating wiring harness connector 8, shown in chain line, to be fixed to the shroud 2, while, at the same time as being fixed, making electrical connection with terminals 4 of the probe transducer subassembly.

A first alternative is shown in FIG. 4 which shows details of a shroud 2A which is substantially and functionally identical to shroud 2 discussed above except for the bayonet fitting alternative to fine threading 16 of FIG. 1. Progressive or helical bayonet fitting 24 allows quicker assembly of a ferrule of the end protector 8 and disassembly thereof, also bayonet grooves are less prone to damage or jamming up. Bayonet connections, as used for 35 mm camera lens mounting, are known in the art. The stepped shroud portion 10 may have an internal chamfer 25 of 15° in order to facilitate rapid centering and engagement of the probe flange 11, before the probe end 15 enters the neck portion 12 of the shroud.

FIG. 5 shows a flange portion 9A only of a two piece shroud, having two clamping holes 26 rather than one for clamping bolts. Although a single clamping hole may be adequate in some instances, two are presently preferred for this embodiment with a two piece shroud, for more symmetrical forces. The two bolt holes are located each side of a central larger hole 27, which is used for accepting in hard push fit engagement from the test environment side, of a separate axial shroud piece 28 shown in FIG. 6.

It should be noted that the hole 27 has a chamfer 29, typically of 45°, between a slightly wider diameter 36 and a slightly smaller diameter 31, so that an axially inserted piece 28 from the left as viewed in the side or detail of FIG. 5, can abut the annular taper which forms therefore a receiving seat 32.

The second axial piece 28 of the shroud is shown in FIG. 6, and has a large diameter external portion 33 and a small diameter external portion 34, also a fine threaded Portion 16 (or alternately, a bayonet connection). The large and small diameters transit over an annular e.g. 45° tapered external portion 35 which is dimensioned to push fit into and seat on the matching receiving seating 32 shown in FIG. 5 of the flange portion of the shroud. When so push-fitted, the FIG. 6 piece forms with the FIG. 5 piece a shroud effectively similar to that of FIG. 1 or 3 but easier to manufacture, and to store compactly. A 45° chamfer 36 on the threaded end 16 assists engagement by an end protector 8.

The axial shroud piece of FIG. 6 engages the housing 7 and the flange enlargement 11 of the probe 1, to clamp as in FIG. 1.

Accordingly, it may be seen that a new and improved probe transducer subassembly for a rotational speed sensor assembly has been provided.

Although this invention has been described in its preferred embodiment with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

We claim:

1. A rotational speed probe transducer subassembly for fixedly mounting a probe transducer (1) to a support housing (7) to extend through an opening (19) in said support housing (7) for cooperation with a relatively rotatable exciter rotor, said subassembly comprising:
    a generally cylindrically shaped probe body (1) comprising an elongated transducer portion (14) adapted to extend from the exterior of said housing closely through said opening into the interior (13) of said housing, a distal exterior portion (15) from which electrical connections (4) extend and an enlarged diameter mounting portion (11) axially intermediate said transducer and distal portions, said enlarged diameter and transducer portions defining an inwardly facing shoulder at the intersection thereof for cooperation with the exterior surface of said housing surrounding said opening and said enlarged diameter and distal portions defining an outwardly facing shoulder at the intersection thereof,
    a multiple piece shroud (2B) comprising a generally flat flange piece (9A) and a generally axially extending tubular shaped neck portion piece, said generally flat flange piece (9A) having a central bore (27) therethrough for press fit receipt of said generally axially extending tubular shaped neck portion piece (28), said central bore defining a seat (29) at the intersection of larger (30) and smaller (31) interior diameter portions thereof for engagement of a shoulder (35) defined on the exterior of said generally axially extending tubular shaped neck portion piece, said neck piece having an interior bore (21) therethrough for close receipt of said distal portion (15) of said probe body therein, said interior bore including a counterbored portion (10) at the inner end thereof for clamping cooperation with said outwardly facing shoulder defined on said probe body.

2. The subassembly of claim 1 wherein said neck piece of said shroud defines external threads (16) for cooperation with external threads of a wire harness connector (8).

3. The subassembly of claim 1 said neck piece of said shroud defines a bayonet connector fitting (24) on the exterior surface thereof for cooperation with a corresponding bayonet connector of a wire harness connector (8).

4. The subassembly of claims 1, 2 or 3 further comprising annular seal means (5) for sealing interface between the interior surface of said opening (19) and the exterior surface of said transducer portion (14) of said probe body.

5. The subassembly of claim 4 wherein said seal means comprises an O-ring received in an annular groove provided in one of said interior surface and said exterior surface for resilient deformation contact with the other of said interior surface and said exterior surface.

6. The subassembly of claims 1, 2 or 3 further comprising annular seal means (6) for sealing interface between the interior surface of said bore (21) and the exterior surface of said distal portion (15) of said probe body.

7. The subassembly of claim 6 wherein said seal means comprises an O-ring received in an annular groove provided in one of said interior surface and said exterior surface for resilient deformation contact with the other of said interior surface and said exterior surface.

8. The subassembly of claims 1, 2 or 3 wherein said flange portion (9) of said shroud defines at least one bolt hole therethrough for clamping said shroud to the exterior surface of said housing.

9. The subassembly of claim 1 wherein said flange piece (9A) defines a plurality of bolt receiving bores (26) therethrough, said bolt receiving bores generally equally parallel to and circumferentially spaced about said central bore (27).

10. The subassembly of claim 1 wherein said shoulder (35) and said seat (32) define complementary chamfers.

* * * * *